Figure 1:
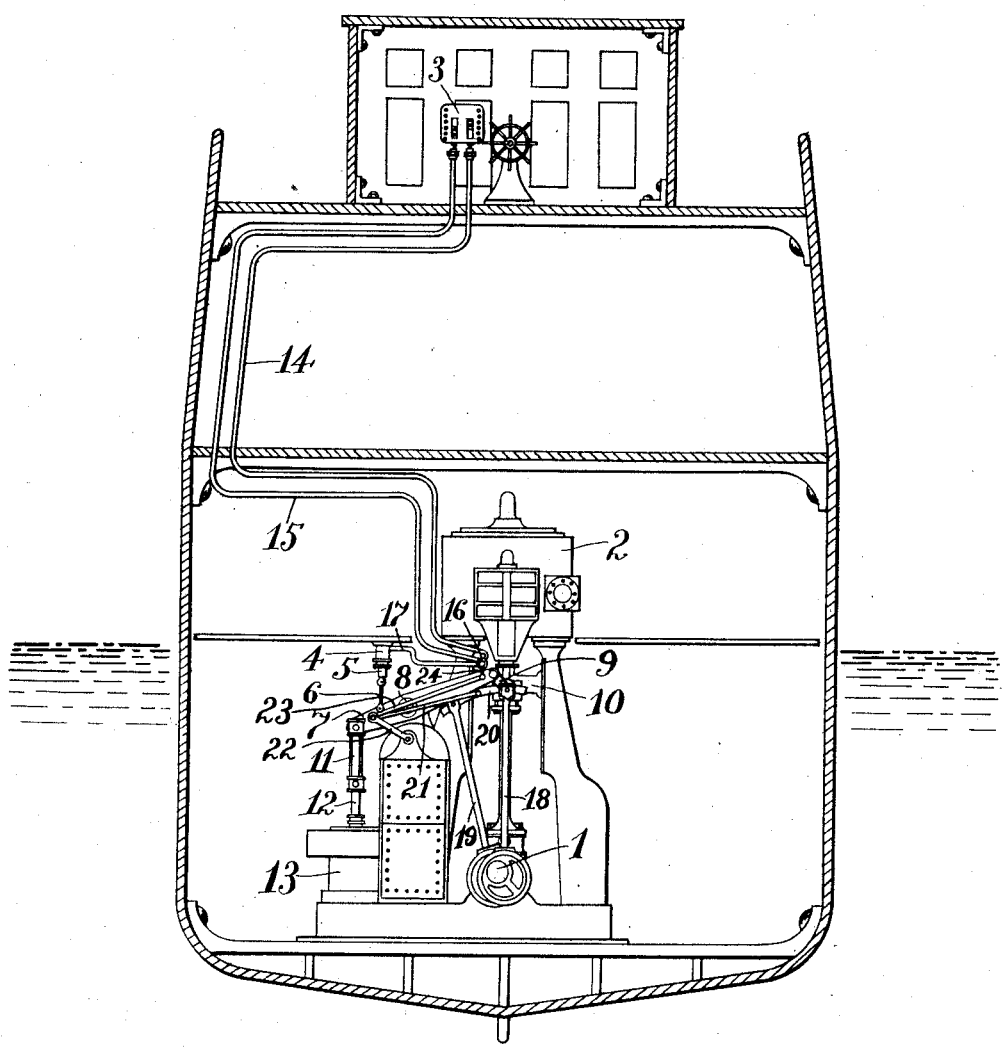

A. McNAB.
REGISTERING AND INDICATING APPARATUS.
APPLICATION FILED JULY 22, 1909.

1,010,662.

Patented Dec. 5, 1911.
2 SHEETS—SHEET 1.

Witnesses:
E. Bradford
H R Smith

Inventor
Alexander McNab.
By his Attorney

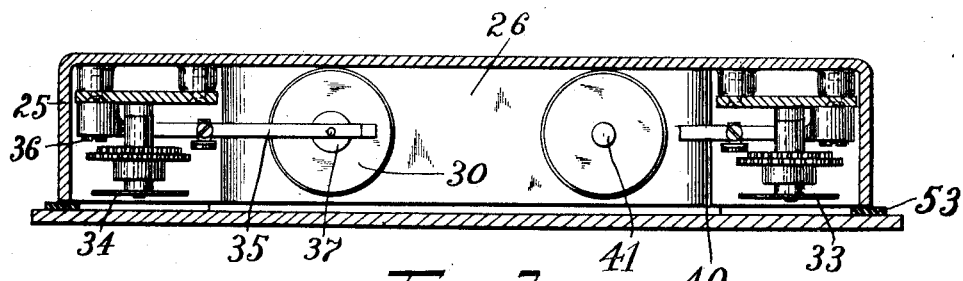
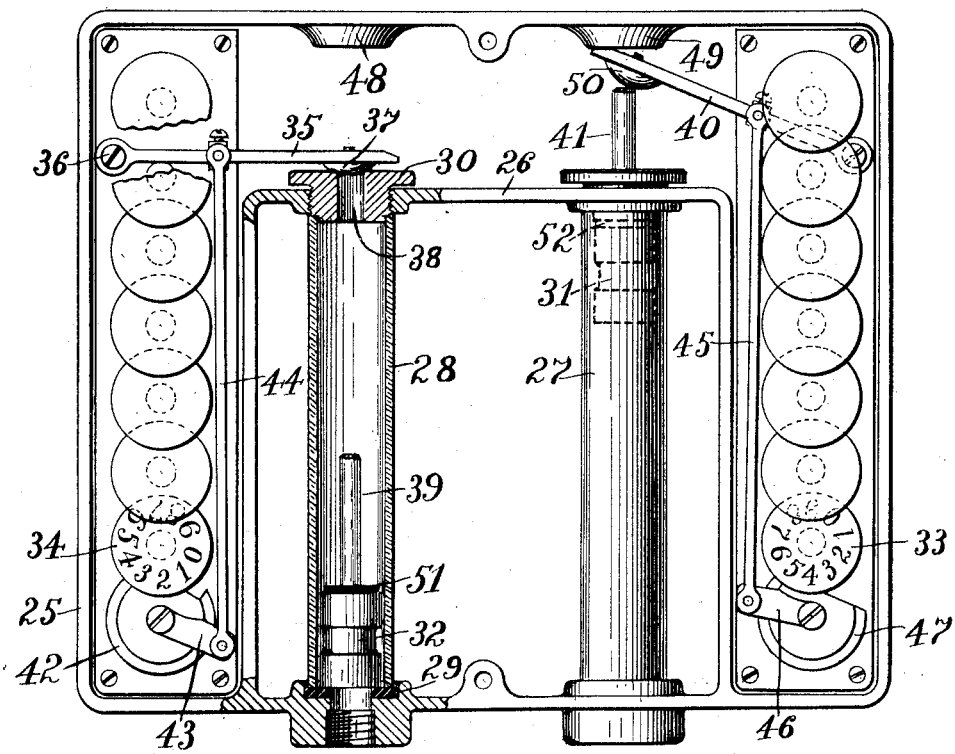

UNITED STATES PATENT OFFICE.

ALEXANDER McNAB, OF NEW LONDON, CONNECTICUT, ASSIGNOR, BY MESNE ASSIGNMENTS, TO THE McNAB COMPANY, OF BRIDGEPORT, CONNECTICUT, A CORPORATION OF CONNECTICUT.

REGISTERING AND INDICATING APPARATUS.

1,010,662.     Specification of Letters Patent.     Patented Dec. 5, 1911.

Application filed July 22, 1909. Serial No. 508,994.

*To all whom it may concern:*

Be it known that I, ALEXANDER McNAB, a citizen of Great Britain, residing at New London, in the county of New London and State of Connecticut, have invented certain new and useful Improvements in Registering and Indicating Apparatus, of which the following is a specification.

This invention relates particularly to apparatus for indicating, at some point or points such as the pilot house or bridge of a ship, the direction of movement of the propeller and registering the number of revolutions.

It is of the utmost importance on board ship for the officer in command to know whether his order to go "ahead", "astern", "full speed," "slow" or "stop" is complied with promptly. On large ships of course the sound of the engine can be heard but the inertia of the ship is so great that it takes some time for any change in the direction of the engine to affect the ship perceptibly. Prompt action is especially necessary in docking and navigating in harbors and narrow channels. Several different forms of apparatus have been proposed for signaling so as to avoid accident.

My principal object is to avoid the former difficulties and at a reasonable cost provide simple and reliable apparatus which can be readily installed and which will insure prompt notice of any change of speed or direction of the propelling mechanism and register the number of revolutions ahead and astern separately.

I have shown the apparatus applied to a ship with an ordinary reciprocating engine directly connected with the main propeller shaft. The principle of the apparatus is pneumatic. A small piston like a pump but without valves of any kind and which I will call an "agitator" is driven by or at a speed proportioned to the propeller. The indicating and registering mechanisms are located in the pilot house, on the bridge, in the captain's room or in one or more places as desired. Small pipe lines connect the agitator with the indicating and registering instruments. In its preferred form each instrument consists of two glass tubes with movable plungers and counters operated thereby. In the arrangement herein illustrated, there is one mechanism operated when the propeller is going "ahead" and one for "astern." A two-way cock connected with the engine valve gear is turned when the position of the engine valves is changed so that the pulsations of the agitator are transmitted through the proper pipes to the proper tubes.

Figure 1, is a vertical cross sectional illustrative view of a ship showing an engine with apparatus of my invention installed. Fig. 2, is a front view of the indicator and register, the front of the casing being removed and the "astern" tube shown in section. Fig. 3, is a horizontal section and plan view of the casing and mechanism shown in Fig. 2, part of the arm of the "ahead" mechanism being broken away.

The main propeller shaft 1 is driven by the engine 2. The indicating and registering apparatus 2 is located in any desired place. The cylinder 4 of the agitator is securely mounted in any convenient place. The piston 5 of the agitator is connected as by a rod 6 to any part of the machinery which moves at a speed in strokes per minute proportioned to the rotations of the propeller as for instance the rocker arm 7 pivoted at 8. This arm is connected by link 9 to the cross head 10 of the engine and performs its usual function of operating the main condenser air pump by the link 11 and rod 12 extending into the casing 13. Pipes 14 and 15 lead from the two-way cock 16 to the indicating and registering instrument. Pipe 17 leads from the agitator to the cock. The valve gear shown is of the usual type with eccentric rods 18 and 19 and link 20 connected by rod 21 to the arm 22. A rod 23 also connects this arm 22 with the arm 24 of the two-way cock 16 so that when the valve gear is thrown so as to reverse the engine the cock is turned to change the air current.

The instrument 3 has a casing 25 with an inner compartment 26 containing the tubes 27 and 28. These tubes are supported on rubber washers such as 29 and clamped at the top by set nuts such as 30. In these tubes are the signal plungers 31 and 32 which fit loosely so as to be raised by a slight air current. The tube and plungers are preferably cylindrical and of such relative diameters that the plungers can move freely up and down and also rotate more or less. This avoids any tendency to bind or stick. I also prefer that the length of a plunger shall be greater than its diameter so that a longer lateral bearing surface is provided to guide it better and prevent the plunger from turning over or wabbling in its tube. I also prefer to make the diameter of a plunger less at the middle than at the ends. This reduces the bearing surface and provides an annular recess at the side which contains a small volume of air around the plunger and helps to minimize surface friction. The right hand plunger 31 is operated when the propeller is going "ahead" and the left hand plunger 32 when going "astern".

The indicator alone is not claimed herein but in my application #491,107 filed April 20th, 1909.

The registering mechanism consists of any suitable type of counter such as a set of numbered dials driven one from the other. One set is provided for each side as 33 and 34, the units dial being at the bottom and driven by the plungers 31 and 32 respectively. Arm 35 pivoted at 36 may have a rubber button 37 arranged over the passage 38 in the set nut 30. The extension 39 on plunger 32 when raised by the air current is adapted to strike button 37 and lift the arm 35. Arm 40 at the right is shown engaged by extension 41 of plunger 31 and lifted. The verge or driver 42 of the "astern" counter train has an arm 43 connected by rod 44 to arm 35 so that as arm 35 is raised and dropped the verge is oscillated. This oscillation is transformed into rotary movement of the counter dials by the usual escapement mechanism. Arm 40 at the right is connected by rod 45 to arm 46 of the verge 47 of the "ahead" register. Rubber pads or springs 48 and 49 are located above the arms 35 and 40 to limit the upward throw and hasten the return movement. The rubber buttons 37 and 50 cushion the drop of the arms. The rubber washers such as 29 cushion the plungers 32 and 31 at the bottom and the washers 51 and 52 check the plungers on the upward strokes. A gasket 53 insures a tight joint between the cover and body of the casing, and, the indicator plungers and register dials are visible through openings in the cover protected by glass or other transparent material. The arrangement is such that the in-stroke of the agitator piston forces the air in the pipe-line toward the instrument plunger to raise it and the out-stroke reduces the pressure and assists in pulling the indicator plunger down. This greatly increases the speed at which the apparatus can be operated with accuracy. Inclination of the indicator tubes does not in any way interfere with the operation of the plungers which are not dependent either upon gravity alone or any springs. The registering mechanism is not connected to the indicator plungers but is operated by the impact thereof. The indicator plungers are therefore free to operate even if the counters for any reason should become inoperative. It is also possible to obtain a sharp impact blow of such a light, free plunger by its momentum gathered in the first part of its upward movement when it is unrestrained.

The agitator, air pipes and instruments are preferably air tight so that the piston 5 simply agitates the air contained therein. No moisture therefore can enter the system. The agitation necessary to operate the indicator plungers however is so slight that the plungers respond instantly to the action of the piston 5 even when there are a number of holes, loose joints, or cracks in the pipes permitting leakage of air.

For ships having more than one propeller shaft, apparatus such as shown would be arranged for each shaft. The same registering and indicating instruments may be used no matter what the type of engine or motor is. In case an internal combustion motor is employed a clutch would of course be interposed between the motor and propeller and the agitator would be driven from the propeller shaft or some part always connected thereto, and the reverse lever of the transmission gear would be connected to the two-way cock. In case the reversal of the ship is obtained by reversing the propeller blades the two-way cock would simply be connected to the reversing mechanism. Turbine driven ships sometimes have one or more turbines on an "ahead" shaft or shafts and another turbine on an "astern" shaft. In this case separate agitators may be driven from the different shafts and each agitator connected by a pipe to an indicator tube and register. On a ferry boat which is intended to travel equally in both directions, what would be "ahead" at one end would be "astern" at the other and vice versa. With an instrument at each end of the boat "ahead" revolutions when going one way would thus be added on the register to "astern" revolutions when going the opposite way. To avoid this the registering mechanism should be turned off at the end which happens to be the "stern." In some cases the plungers need not be visible, and in other cases the indicators alone will be sufficient. Sometimes the "ahead" and "astern" instruments may be made separate and installed where most convenient. Ordinarily the instruments will be so arranged and adjusted as to be silent, but if desired, the plungers may be adjusted to make a noise and by making the ahead and astern plungers of different material or to strike against different substances, different sounds will be given off so as to distinguish between the two even in the dark.

The indicating and registering instruments themselves herein described may be used in other ways than as shown in connection with other forms of mechanism or apparatus whose movement it may be desirable to indicate or register.

The particular advantages of the system and apparatus are simplicity and reliability. There is little to get out of order, no wires, pulleys or electrical contacts or devices. The apparatus can be easily installed by any ordinary pipe fitter. Although the apparatus is very sensitive it does not require any fine adjustments and it will operate perfectly even when carelessly installed or in bad condition. It has been successfully operated with the instrument 1000 feet away from the agitator and at speeds of from 5 to 500 revolutions per minute.

Other forms of mechanism may be operated pneumatically as herein shown.

What I claim is:

An apparatus for indicating and registering the number of revolutions of a shaft, comprising an air tight casing, an agitator driven positively with a motor, indicator tubes within said casing and communicating therewith, freely movable plungers within said tubes and having pin extensions, registering mechanisms comprising a train of sequentially connected counters, levers pivoted within said casing and normally within the path of said extensions, and operative connections between said levers and registering mechanisms whereby the impacts and withdrawals of said extensions will throw said levers and allow them to return to normal positions and thereby effect the operation of said registering mechanisms.

ALEXANDER McNAB.

Witnesses:
CHARLES H. KENNEY,
FRANK L. McGUIRE.

---

Copies of this patent may be obtained for five cents each, by addressing the "Commissioner of Patents, Washington, D. C."